(12) United States Patent
Tangudu et al.

(10) Patent No.: US 11,028,877 B2
(45) Date of Patent: Jun. 8, 2021

(54) MAGNETIC RADIAL BEARING WITH FLUX BOOST

(71) Applicant: Carrier Corporation, Palm Beach Gardens, FL (US)

(72) Inventors: Jagadeesh Kumar Tangudu, South Windsor, CT (US); Parag M. Kshirsagar, South Windsor, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 111 days.

(21) Appl. No.: 16/489,843

(22) PCT Filed: Feb. 19, 2018

(86) PCT No.: PCT/US2018/018624
§ 371 (c)(1),
(2) Date: Aug. 29, 2019

(87) PCT Pub. No.: WO2018/182872
PCT Pub. Date: Oct. 4, 2018

(65) Prior Publication Data
US 2020/0025246 A1    Jan. 23, 2020

Related U.S. Application Data

(60) Provisional application No. 62/480,412, filed on Apr. 1, 2017.

(51) Int. Cl.
*F16C 32/04* (2006.01)
*H02K 7/09* (2006.01)
*H02K 5/16* (2006.01)

(52) U.S. Cl.
CPC ...... *F16C 32/0468* (2013.01); *F16C 32/0465* (2013.01); *H02K 7/09* (2013.01); *F16C 2360/00* (2013.01); *H02K 5/16* (2013.01)

(58) Field of Classification Search
CPC .............. F16C 32/0468; F16C 32/0465; F16C 2360/00; F16C 32/0431; F16C 32/0436;
(Continued)

(56) References Cited

U.S. PATENT DOCUMENTS 3,958,842 A    5/1976   Telle
4,037,886 A *  7/1977   Boden ................. F16C 32/0474
                                                    310/90.5

(Continued)

FOREIGN PATENT DOCUMENTS

CN    201307809 Y    9/2009
CN    201696492 U    1/2011
(Continued)

OTHER PUBLICATIONS

Office Action dated Sep. 2, 2020 for Chinese Patent Application No. 201880022879.6.
(Continued)

*Primary Examiner* — Ahmed Elnakib
(74) *Attorney, Agent, or Firm* — Bachman & LaPointe, P.C.

(57) ABSTRACT

A magnetic bearing (20; 220; 320) comprises: a rotor (22; 322) to be supported for rotation about an axis (502); a stator (24; 224) extending from a first end (30) to a second end (32) and comprising: one or more first permanent magnets (50); one or more second permanent magnets (52) axially spaced from the one or more first permanent magnets; one or more intermediate permanent magnets (60; 230; 232) axially between the one or more first permanent magnets and one or more second permanent magnets; laminate teeth (64A, 64B, 66A, 66B) radially inward of the one or more intermediate permanent magnets; and a plurality of radial windings (34A, 34B, 36A, 36B), respectively encircling a respective associated tooth of the plurality of teeth.

18 Claims, 11 Drawing Sheets

(58) Field of Classification Search
CPC  F16C 32/0438; F16C 32/044; F16C 32/0459; F16C 32/0461; F16C 32/0474; F16C 32/0476; F16C 32/0478; F16C 32/0489; F16C 32/0491; F16C 32/0493; F16C 32/0495; F16C 32/0497; F16C 23/043; F16C 23/045; F16C 32/0406; F16C 32/0408; F16C 32/041; F16C 32/0412; F16C 32/0419; F16C 32/0421; F16C 32/0423; F16C 32/0429; H02K 5/16; H02K 7/09
USPC .......................................................... 310/90.5
See application file for complete search history.

(56) References Cited

U.S. PATENT DOCUMENTS

| | | | |
|---|---|---|---|
| 4,196,946 A | 4/1980 | Lipscomb | |
| 4,285,552 A | 8/1981 | Sutter | |
| 4,447,793 A | 5/1984 | Gray | |
| 4,542,311 A | 9/1985 | Newman et al. | |
| 4,634,191 A | 1/1987 | Studer | |
| 4,732,353 A | 3/1988 | Studer | |
| 4,891,567 A | 1/1990 | Fujitani et al. | |
| 5,095,237 A | 3/1992 | Bardas et al. | |
| 5,172,021 A * | 12/1992 | Takahashi | F16C 32/0402 310/156.04 |
| 5,179,308 A | 1/1993 | Malsky | |
| 5,202,598 A | 4/1993 | Katsumata | |
| 5,216,308 A | 6/1993 | Meeks | |
| 5,220,232 A | 6/1993 | Rigney, II et al. | |
| 5,231,336 A | 7/1993 | van Namen | |
| 5,319,273 A | 6/1994 | Hockney et al. | |
| 5,514,924 A | 5/1996 | McMullen et al. | |
| 5,572,079 A | 11/1996 | Pinkerton | |
| 5,736,800 A | 4/1998 | Iannello et al. | |
| 5,767,597 A | 6/1998 | Gondhalekar | |
| 6,121,704 A | 9/2000 | Fukuyama et al. | |
| 6,130,494 A | 10/2000 | Schob | |
| 6,278,251 B1 | 8/2001 | Schob | |
| 6,351,048 B1 | 2/2002 | Schob et al. | |
| 6,359,357 B1 | 3/2002 | Blumenstock | |
| 6,727,617 B2 | 4/2004 | McMullen et al. | |
| 6,777,841 B2 | 8/2004 | Steinmeyer | |
| 6,846,168 B2 | 1/2005 | Davis et al. | |
| 6,849,960 B2 | 2/2005 | Hartman et al. | |
| 7,126,244 B2 | 10/2006 | Rozmus | |
| 7,598,646 B2 | 10/2009 | Cleveland | |
| 7,786,638 B2 | 8/2010 | Pulnikov et al. | |
| 7,859,144 B1 | 12/2010 | Sahyoun | |
| 7,868,510 B2 | 1/2011 | Rittenhouse | |
| 8,169,118 B2 | 5/2012 | Filatov | |
| 8,400,038 B2 | 3/2013 | Smith et al. | |
| 8,847,451 B2 | 9/2014 | Filatov et al. | |
| 2003/0042812 A1 | 3/2003 | Post | |
| 2003/0042816 A1 | 3/2003 | Post | |
| 2003/0192449 A1 | 10/2003 | Fiske et al. | |
| 2004/0022653 A1 | 2/2004 | Brunet et al. | |
| 2004/0135450 A1 | 7/2004 | Kanebako | |
| 2008/0042504 A1 | 2/2008 | Thibodeau et al. | |
| 2009/0121571 A1* | 5/2009 | Onuma | F04D 29/058 310/90.5 |
| 2009/0126519 A1 | 5/2009 | Chassoulier | |
| 2010/0013332 A1 | 1/2010 | Vollmer | |
| 2010/0013340 A1 | 1/2010 | Brown | |
| 2010/0090556 A1 | 4/2010 | Filatov | |
| 2010/0231076 A1 | 9/2010 | Chiba et al. | |
| 2011/0101905 A1 | 5/2011 | Filatov | |
| 2011/0163622 A1 | 7/2011 | Filatov et al. | |
| 2012/0093669 A1 | 4/2012 | Gieras et al. | |
| 2012/0139375 A1 | 6/2012 | Masuzawa et al. | |
| 2012/0299422 A1 | 11/2012 | Filatov | |
| 2012/0306305 A1 | 12/2012 | Filatov | |
| 2013/0062984 A1 | 3/2013 | Tremelling | |
| 2013/0216351 A1 | 8/2013 | Griffin | |
| 2015/0137642 A1 | 5/2015 | Vande Sande | |
| 2015/0330444 A1 | 11/2015 | Wang | |
| 2017/0007973 A1 | 1/2017 | Schöb et al. | |

FOREIGN PATENT DOCUMENTS

| | | |
|---|---|---|
| CN | 101979888 A | 2/2011 |
| CN | 201730962 U | 2/2011 |
| CN | 102042327 A | 5/2011 |
| CN | 102808846 A | 12/2012 |
| CN | 102305242 B | 3/2013 |
| CN | 103427538 A | 12/2013 |
| CN | 103470630 A | 12/2013 |
| CN | 103671522 A | 3/2014 |
| CN | 103758766 A | 4/2014 |
| CN | 203962688 U | 11/2014 |
| CN | 104632890 A | 5/2015 |
| CN | 204572784 U | 8/2015 |
| CN | 204572787 U | 8/2015 |
| DE | 102006062420 A1 | 12/2007 |
| DE | 102008021587 B3 | 12/2009 |
| EP | 0071456 A1 | 2/1983 |
| EP | 0839291 B1 | 5/1998 |
| EP | 2060811 A1 | 5/2009 |
| EP | 2594477 A1 | 5/2013 |
| EP | 2886891 A1 | 6/2015 |
| EP | 3115103 A1 | 1/2017 |
| FR | 2759434 A1 | 8/1998 |
| FR | 2954961 A1 | 7/2011 |
| JP | 57116933 A | 7/1982 |
| JP | 58184319 A | 10/1983 |
| JP | 11101233 A | 4/1999 |
| JP | 2001041239 A | 2/2001 |
| JP | 2001224154 A | 8/2001 |
| JP | 2001248639 A | 9/2001 |
| JP | 2002161918 A | 6/2002 |
| JP | 2010121713 A | 6/2010 |
| JP | 2011085223 A | 4/2011 |
| JP | 2013231471 A | 11/2013 |
| WO | 97/00639 A2 | 1/1997 |
| WO | 2007/049084 A1 | 5/2007 |
| WO | 2014/007851 A1 | 1/2014 |
| WO | 2016/137775 A1 | 9/2016 |
| WO | WO 2016/137775 * | 9/2016 |
| WO | 2018/182891 A1 | 10/2018 |
| WO | 2018/182905 A1 | 10/2018 |

OTHER PUBLICATIONS

Jun Wang et al., "Intelligent Control in Current Digital Switching Power Amplifier for Active Magnetic Bearing", Jun. 1, 2015, pp. 31-39, Metallurgical and Mining Industry, Ukraine.
David C. Meeker et al., "Analysis and Control of a Three Pole Radial Magnetic Bearing", Tenth Int. Symp. Magnetic Bearings, Aug. 21, 2006, Martigny, Switzerland.
International Search Report and Written Opinion dated May 31, 2016 for PCT/US2016/017943.
Office Action dated Aug. 6, 2019 for U.S. Appl. No. 15/548,613.
International Search Report and Written Opinion dated May 15, 2018 for PCT/US2018/019538.
International Search Report and Written Opinion dated Jun. 11, 2018 for PCT/US2018/018624.
International Search Report and Written Opinion dated Jun. 7, 2018 for PCT/US2018/019903.
LThinese Office Action dated Jan. 25, 2019 for Chinese Patent Application No. 201680012346.0.
Chinese Office Action dated Mar. 31, 2020 for Chinese Patent Application No. 201680012346.0.

* cited by examiner

MAGNETIC RADIAL BEARING WITH FLUX BOOST

CROSS-REFERENCE TO RELATED APPLICATION

Benefit is claimed of U.S. Patent Application No. 62/480,412, filed Apr. 1, 2017, and entitled "Magnetic Radial Bearing with Flux Boost", the disclosure of which is incorporated by reference herein in its entirety as if set forth at length.

BACKGROUND

The disclosure relates to magnetic bearings. More particularly, the disclosure relates to electromagnetic bearings utilized in turbomachines.

A well-developed art exists in active magnetic bearings. US Patent Application Publication 2011/0163622A1 (US '622), published Jul. 7, 2011, discloses an electromagnetic bearing providing radial and axial support. For axial support, the stator has a pair of opposite axial poles joined at an outer diameter (OD) by an axial back iron. An axial coil circumferentially wraps inboard of the back iron and creates a flux path through the axial poles and back iron with an inboard gap between the axial poles spanned by an actuator target formed by a rotor lamination stack within the gap.

Generally, radially inboard of the axial coil, the US '622 stator comprises a radial actuator pole assembly formed by a lamination stack. This lamination stack has a full annulus outer ring portion and a plurality of radially-inward projections each of which is wrapped by an associated radial control coil. Adjacent the radial actuator pole assembly at opposite axial ends thereof, sandwiched between the radial actuator pole assembly and the axial poles, are a pair of permanent magnetic rings.

Generally, a pair of radial flux loops are created at opposite sides proceeding radially from the US '622 actuator target through the radial pole assembly, turning axially outboard through the permanent magnet and then radially inboard through the associated axial pole, turning back axially inward to enter the end of the actuator target and then turning back radially outward. Thus, a pair of radial fluxes of opposite sign are encircled by the axial flux loop.

Another four-radial-pole radial bearing configuration involves flux paths that pass radially and circumferentially rather than axially. In this configuration, switching can be between several conditions. One group involves flux paths with a central diametric leg through one opposed pair of poles and two circumferential legs passing circumferentially through the back iron around the respective poles of the other pair. The two pairs thus create two possible such paths with two possible directions for each path. Additionally another group involves a first flux path leg passing radially through one pole, turning circumferentially to pass through the back iron to one of the two adjacent poles and then returning back radially through that adjacent pole to meet the first leg in the shaft.

PCT/US2016/017943, filed Feb. 15, 2016 and entitled "Magnetic Bearing" and published Sep. 1, 2016 as WO/2016/137775 (the WO '775 publication), the disclosure of which is incorporated by reference herein in its entirety as if set forth at length, discloses a magnetic radial/thrust bearing utilizing permanent magnet bias and electromagnet bias.

U.S. Patent Application No. 62/381,746, filed Aug. 31, 2016, and entitled "Magnetic Thrust Bearing", the disclosure of which is incorporated by reference herein in its entirety as if set forth at length, discloses a magnetic thrust bearing combining permanent magnet bias and electromagnet bias.

SUMMARY

One aspect of the disclosure involves a magnetic bearing comprising: a rotor to be supported for rotation about an axis; a stator extending from a first end to a second end and comprising: one or more first permanent magnets; one or more second permanent magnets axially spaced from the one or more first permanent magnets; one or more intermediate permanent magnets axially between the one or more first permanent magnets and one or more second permanent magnets; a plurality of laminate teeth radially inward of the one or more intermediate permanent magnets; and a plurality of radial windings respectively encircling a respective associated tooth of the plurality of teeth.

In one or more embodiments of the other embodiments, the one or more first permanent magnets and the one or more second permanent magnets are non-rare earth magnets.

In one or more embodiments of the other embodiments, the one or more intermediate permanent magnets are non-rare earth magnets.

In one or more embodiments of the other embodiments: the one or more second permanent magnets have a polarity substantially opposite to a polarity of the one or more first permanent magnets; and the one or more intermediate permanent magnets have a polarity substantially transverse to said polarities of the one or more first permanent magnets and the one or more second permanent magnets.

In one or more embodiments of the other embodiments, the one or more first permanent magnets and the one or more second permanent magnets are full annulus.

In one or more embodiments of the other embodiments, the one or more intermediate permanent magnets, are full annulus.

In one or more embodiments of the other embodiments, the magnetic bearing is a non-thrust bearing.

In one or more embodiments of the other embodiments, the stator further comprises: a first end yoke axially abutting the one or more first permanent magnets; and a second end yoke axially abutting the one or more second permanent magnets.

In one or more embodiments of the other embodiments, the stator further comprises: a first end laminate encircled by the first end yoke; and a second end laminate encircled by the second end yoke.

In one or more embodiments of the other embodiments, the rotor further comprises: one or more third permanent magnets; one or more fourth permanent magnets axially spaced from the one or more third permanent magnets; and a center laminate axially between the one or more third permanent magnets and the one or more fourth permanent magnets.

In one or more embodiments of the other embodiments, the center laminate has an inner diameter (ID) surface radially outboard of respective inner diameter (ID) surfaces of the at least one third permanent magnet and the at least one fourth permanent magnet.

In one or more embodiments of the other embodiments, the rotor further comprises: a first end laminate axially abutting the one or more third permanent magnets; and a second end laminate axially abutting the one or more fourth permanent magnets.

In one or more embodiments of the other embodiments, the one or more intermediate permanent magnets comprise: one or more first intermediate magnets and one or more second intermediate magnets. The one or more first intermediate magnets are between the one or more first permanent magnets and the one or more second intermediate magnets; the one or more first intermediate magnets have polarities directed partially radially inward relative to polarities of the one or more first permanent magnets; and the one or more second intermediate magnets have polarities directed partially radially inward relative to polarities of the one or more second permanent magnets.

In one or more embodiments of the other embodiments, a method for using the magnetic bearing comprises running current through the plurality of radial windings so as to control radial position of the rotor.

In one or more embodiments of the other embodiments, the plurality of radial windings comprises a diametrically opposite first pair of windings and a diametrically opposite second pair of windings orthogonal to the first pair of windings.

In one or more embodiments of the other embodiments, the first and second pairs of windings are each powered by a respective associated H-bridge amplifier.

In one or more embodiments of the other embodiments, for each winding of the first pair of windings and the second pair of windings: a first permanent magnet flux paths passes as a loop through the winding, the at least one first permanent magnet and the at least one third permanent magnet; and a second permanent magnet flux paths passes as a loop through the winding, the at least one second permanent magnet and the at least one third permanent magnet. The running current comprises running current through one winding of the first pair of windings to augment the associated first and second permanent magnet flux paths while running current through the other winding of the first pair of windings to counter the associated first and second permanent magnet flux paths.

In one or more embodiments of the other embodiments, the running current comprises: running current through one winding of the second pair of windings to augment the associated first and second permanent magnet flux paths while running current through the other winding of the second pair of windings to counter the associated first and second permanent magnet flux paths.

In one or more embodiments of the other embodiments, a machine comprises such a bearing.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
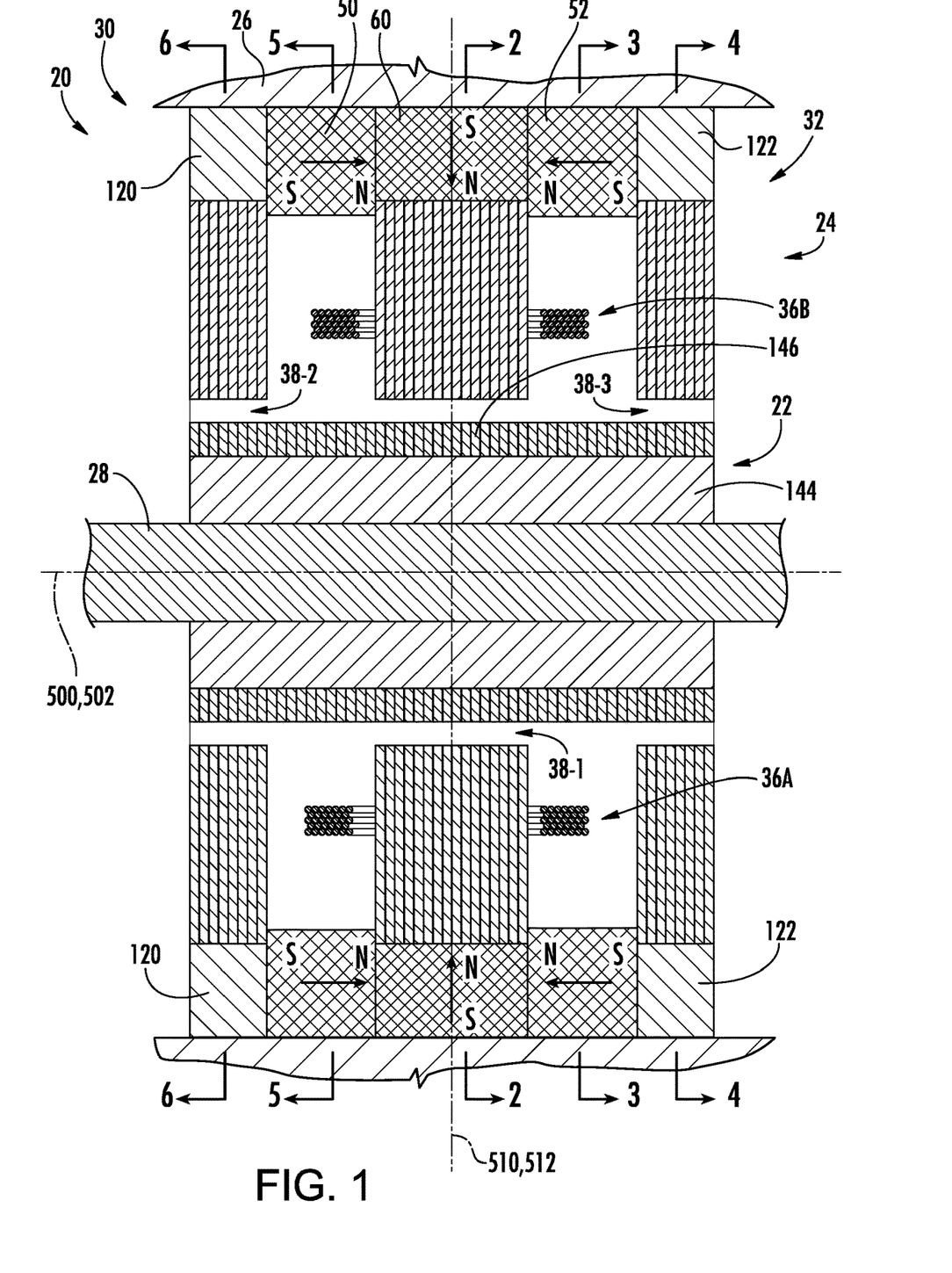
FIG. 1 is a partial, partially schematic, central longitudinal axial sectional view of an electromagnetic bearing in a compressor.

FIG. 1 shows an axial homopolar bearing 20 having a rotor 22 and a stator 24. The stator has a central longitudinal axis 500. The rotor has a central longitudinal axis 502. The axes 500 and 502 are nominally normally coincident; however, the bearing may absorb slight excursions of the rotor axis relative to the stator axis. The magnetic bearing may be used in a turbomachine (e.g., a compressor) wherein the stator is mounted to (or otherwise integrated with) a housing or case of the compressor and the rotor is mounted to (or otherwise integrated with) a shaft of the compressor. A stator transverse centerplane is shown as 510 and the normally coincident rotor transverse centerplane is shown as 512. For purposes of schematic illustration, the housing or case is shown as 26 and the shaft is shown as 28. Exemplary compressors are centrifugal compressors.

The bearing extends from a first end 30 to a second end 32. The stator includes a number of coils (e.g., metallic wire windings). As is discussed further below, the exemplary bearing is a purely radial bearing and not an axial or thrust bearing. Alternative implementations may integrate with axial bearing features. Also, the exemplary embodiment is mechanically symmetric end-to-end about the centerplane 510, 512. It may also be grossly electrically symmetric (e.g., the overall layout of the coils is symmetric) but the wrapping of the coils and the electrical connections may be asymmetric in order to provide the control described.

Figure 2:
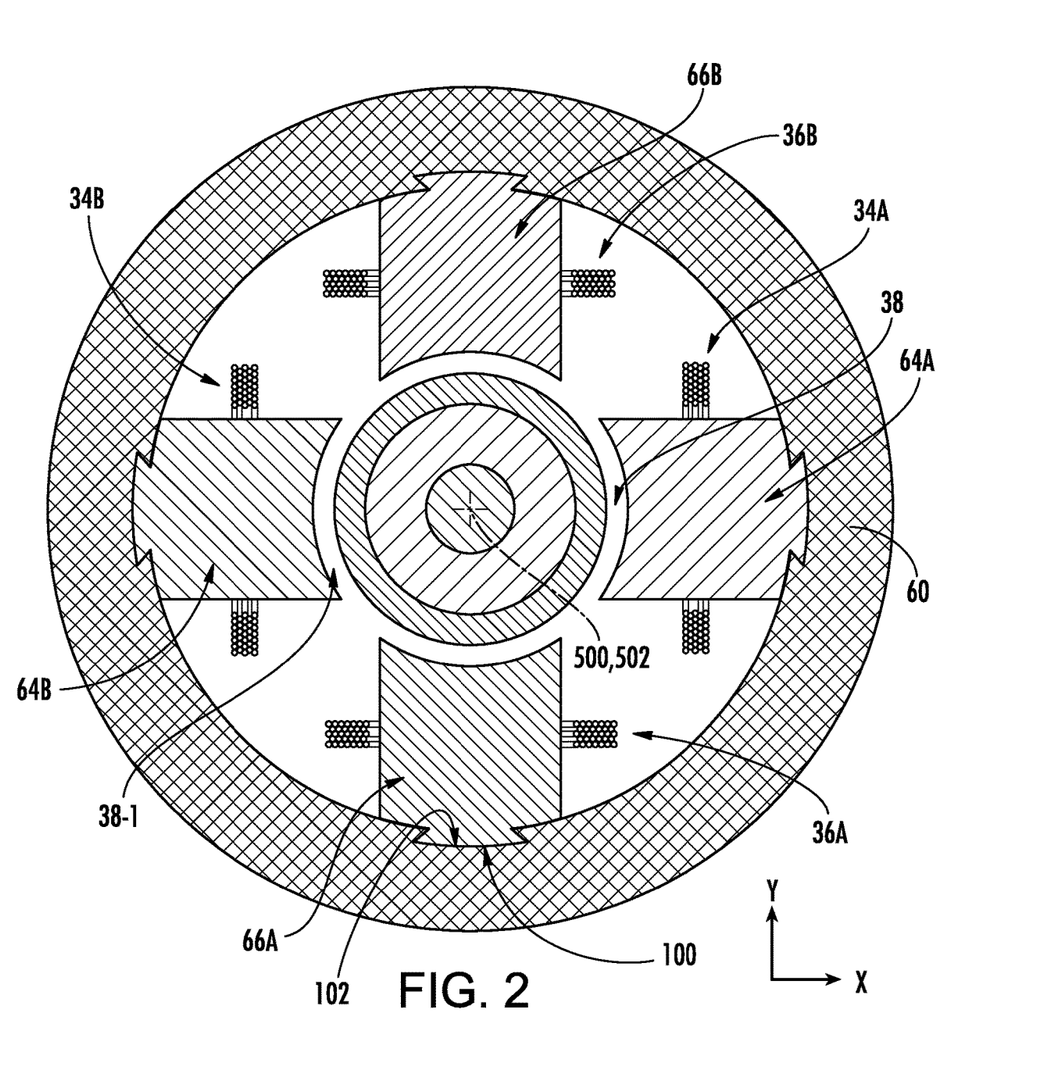
FIG. 2 is a transverse sectional view of the bearing taken along line 2-2 of FIG. 1.
Figure 3:
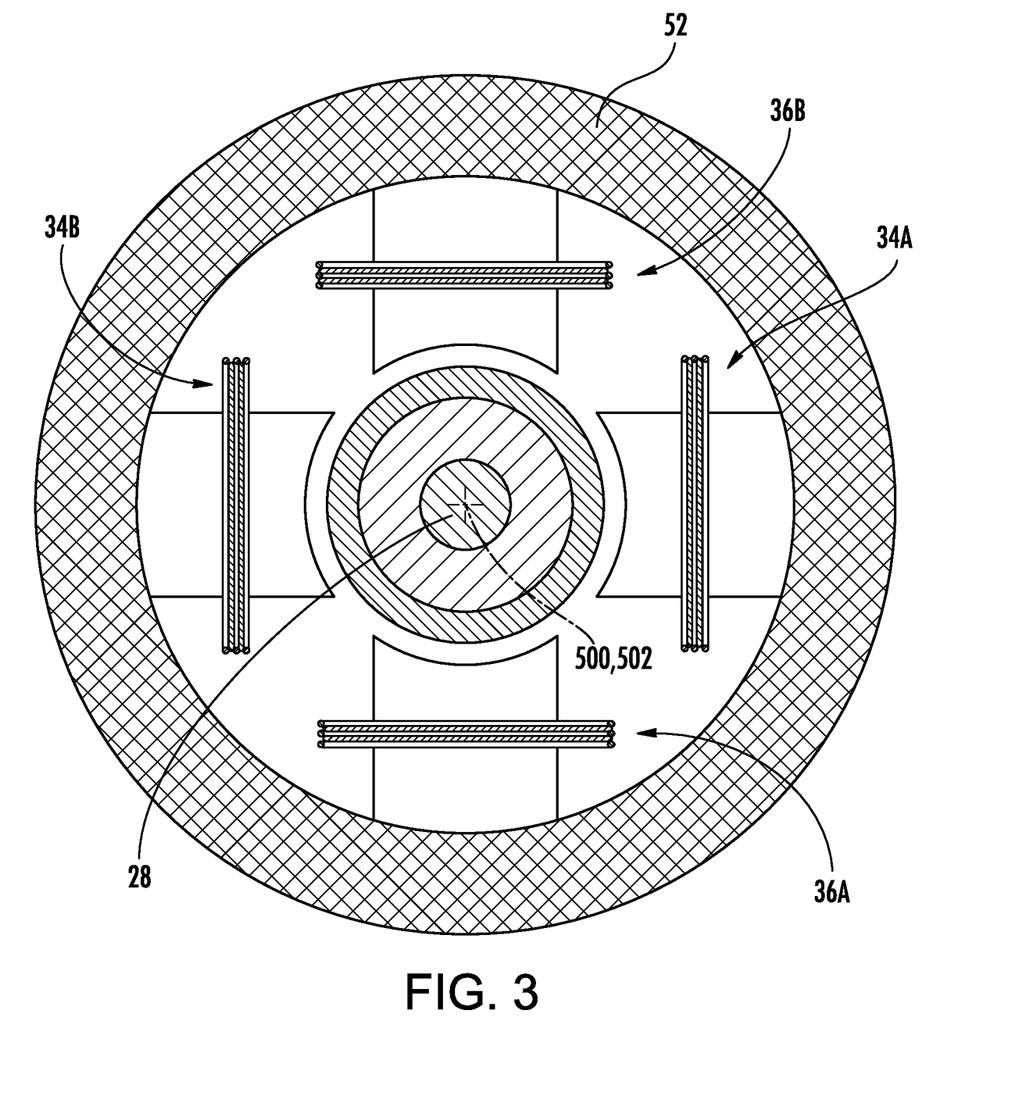
FIG. 3 is a transverse sectional view of the bearing taken along line 3-3 of FIG. 1.

In the exemplary radial bearing, there are four coils: two orthogonal pairs of two diametrically opposed coils. In the X-Y frame of reference shown in FIG. 2, there is a pair of X coils 34A, 34B and a pair of Y coils 36A, 36B. FIG. 2 further shows a local radial gap 38 between rotor and stator. As is discussed further below, in operation magnetic flux crosses the gap 38 at various locations to exert a net force on the rotor. Energizing the X coils in one way exerts a force in the positive X direction and energizing X coils in the opposite way exerts a force in the negative X direction. Similarly, energizing the Y coils in one way exerts a net force in the positive Y direction and energizing the Y coils in the opposite way exerts a force in the negative Y direction. Control may be responsive to conventional radial position sensors (not shown) integrated with or otherwise associated with the bearing. The exemplary coils in a given pair may be electrically connected in series or controlled separately so that currents through them create a radial control field that either opposes or assists a permanent magnet bias field (discussed below).

The stator comprises a first permanent magnet ring 50 (FIG. 1) and a second permanent magnet ring 52 coaxially axially spaced apart from each other. The permanent magnet rings have substantially opposite axial polarity. In this example, the north poles of both magnets face the inward to the transverse centerplane 510 and the axially-opposite south poles face axially outboard/outward. The magnet rings may be full annulus continuous rings or may be segmented (discussed below). Manufacturing tolerances will mean that exact opposite polarity may not be achieved. Typically, this will be achievable within 20° or within 10°. Some alternative configurations may involve intentionally shifting the polarities somewhat off axial so that they may be up to an exemplary 60° off anti-parallel.

Each ring 50, 52 has an inner diameter (ID) face (surface), an outer diameter (OD) face (surface), and opposite axial end faces (surfaces). The rings 50 and 52 are mounted at opposite sides (axial ends) of a central intermediate permanent magnet ring 60. The exemplary central intermediate ring 60 is formed as a continuous full annulus single piece rather than segmented. The central intermediate ring 60 has an ID face and an OD face and opposite axial end faces. Extending radially inward from the ID face are a plurality of laminate teeth (FIG. 2) 64A, 64B, 66A, 66B respectively associated with and encircled by the coils 34A, 34B, 36A, 36B. Exemplary laminates (and other laminates discussed below) are axial stacks of steel plates (e.g., soft magnetic steel or silicon steel). Use of laminate reduces eddy loss relative to a single block of steel. The laminate within the coils functions as a core. The exemplary intermediate ring 60 has a substantially radial polarity transverse to the polarities of the rings 50 and 52 (e.g., subject to the same tolerance issues discussed above).

The exemplary teeth have ID and OD faces, opposite axial end faces, and opposite circumferential end faces. The ID faces fall along a central portion 38-1 of the gap 38. The OD portions may bear attachment features for mounting to the intermediate ring 60. An exemplary attachment feature 100 is a dovetail projection on the OD face of the tooth mating with a dovetail groove or channel 102 in the ID surface of the intermediate ring. In combination, the teeth 64A, 64B, 66A, 66B may be designated as a center laminate. In some implementations, there may be a single center laminate such that, for example, an outer diameter portion is full annulus and the teeth extend radially inward therefrom. Such an assembly could be mounted in the central intermediate ring 60 by shrink fit (e.g., cooling the laminate, sliding the laminate in and then allowing the laminate to warm back up to ambient temperature).

Figure 4:
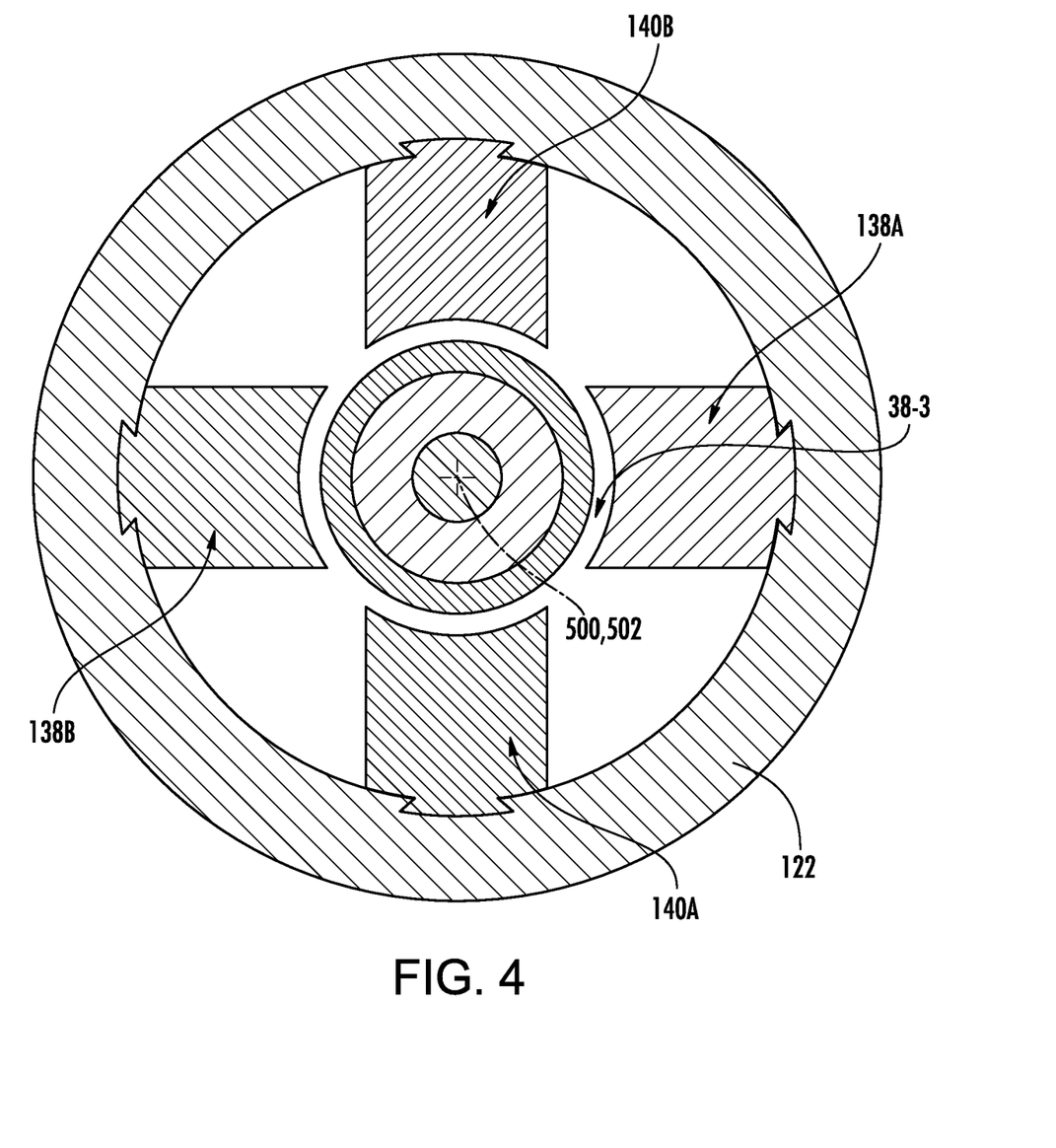
FIG. 4 is a transverse sectional view of the bearing taken along line 4-4 of FIG. 1.
Figure 5:
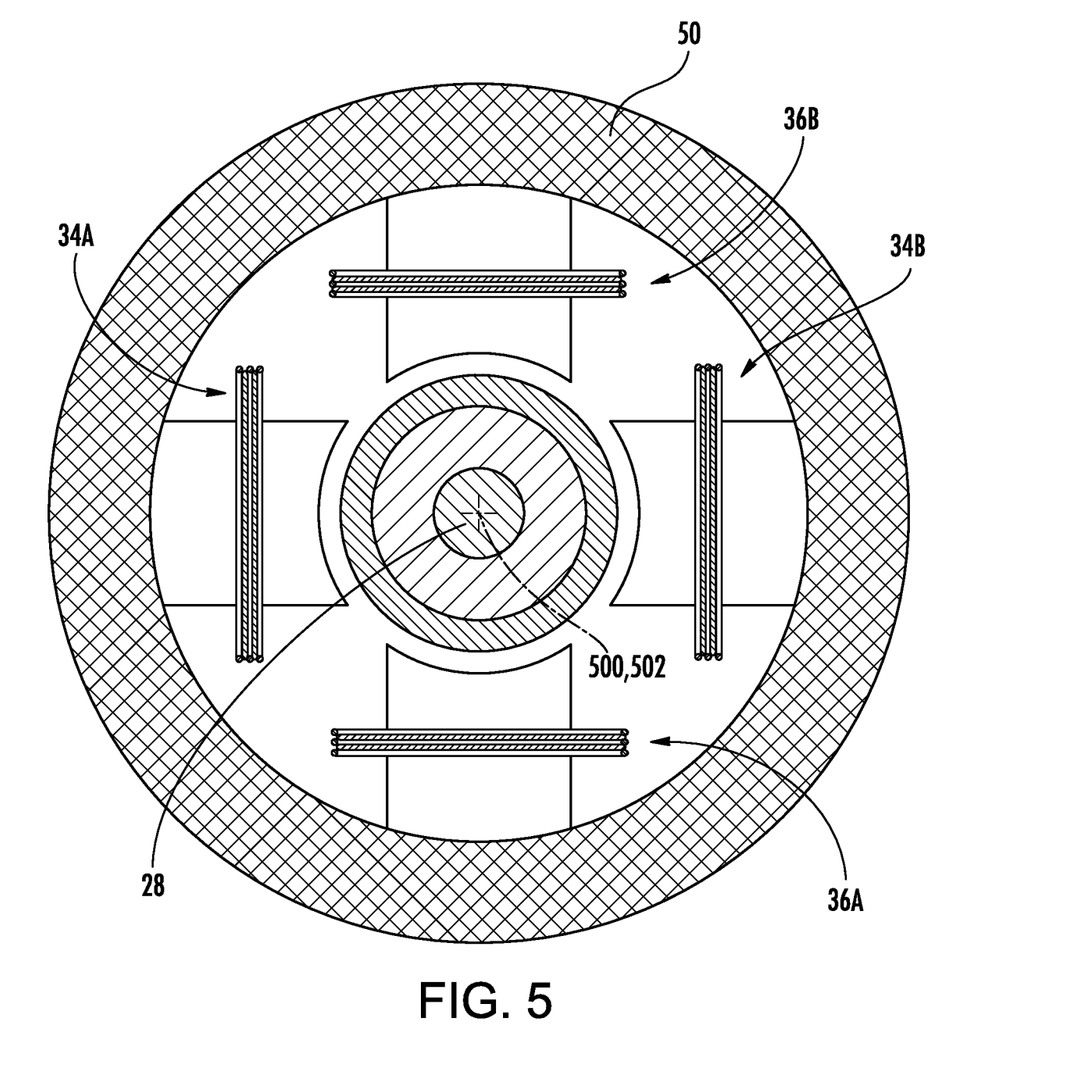
FIG. 5 is a transverse sectional view of the bearing taken along line 5-5 of FIG. 1.
Figure 6:
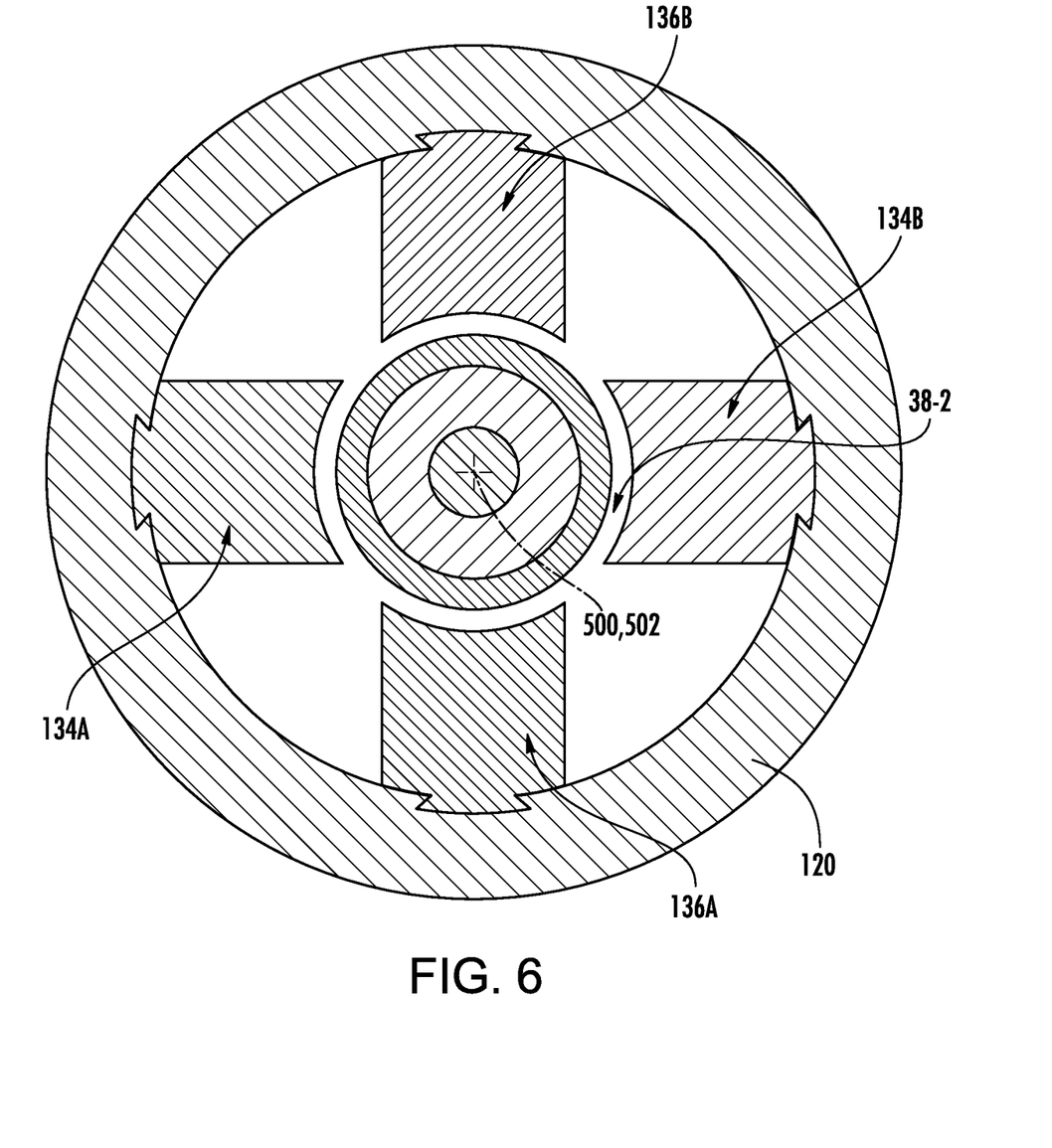
FIG. 6 is a transverse sectional view of the bearing taken along line 6-6 of FIG. 1.

Axially outboard of the rings 50, 52 are respective end members. The exemplary end members each comprise an outer diameter yoke 120, 122 having an ID face, an OD face, and opposite axial end faces. The exemplary yokes (and other back irons or yokes discussed below) are formed of a non-laminate magnetic steel such as 1010 steel. An outboard axial end face falls along the adjacent first or second end of the bearing 20. Each end member also comprises an end laminate. As with the center laminate, the exemplary end laminates are segmented into teeth 134A, 134B, 136A, 136B (FIG. 6), and 138A, 138B, 140A, 140B (FIG. 4). Exemplary teeth geometry and attachments may be similar to those described above for the teeth of the center laminate. FIGS. 4 and 6 show respective portions 38-3 and 38-2 of the gap 38 at the end laminates.

Returning to FIG. 1, the exemplary rotor 22 comprises a metallic core 144 carrying a laminate 146 on its outer diameter (OD) surface. The exemplary laminate 146 is full-length for ease of manufacture. Portions of the laminate axially between the teeth may be essentially non-functional and could be replaced by monolithic steel or other filler material.

Figure 7:
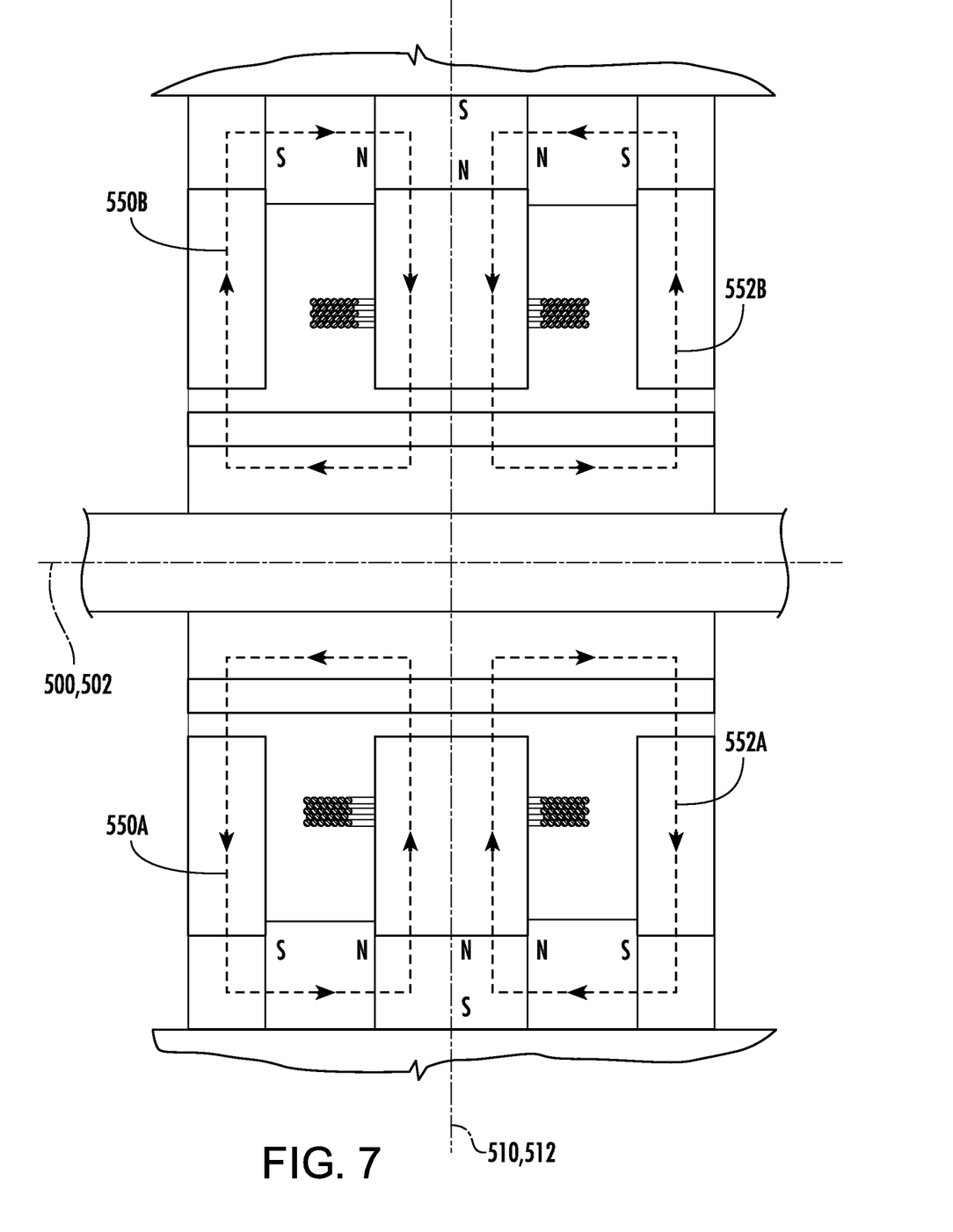
FIG. 7 is a schematic central longitudinal sectional median magnetic flux diagram showing permanent magnet flux.

FIG. 7 shows a schematic longitudinal sectional view centrally through diametrically opposed pair of the center teeth and coils of the bearing 20. In section, four flux loops 550A, 550B, 552A, 552B are shown. These are shown schematically with a single line each rather than a plurality of lines each as in a contour map. Also, though one broken line path is shown through each laminate stack, it would be a distribution of flux across the laminate stack. In FIG. 7, the coils are not energized. Thus, fields in the upper half of the drawing are symmetric to those in the lower half. FIG. 7 thus shows how the radial polarity of the intermediate ring 60 augments the respective flux loops at the respective sides of the transverse centerplane.

Figure 8:
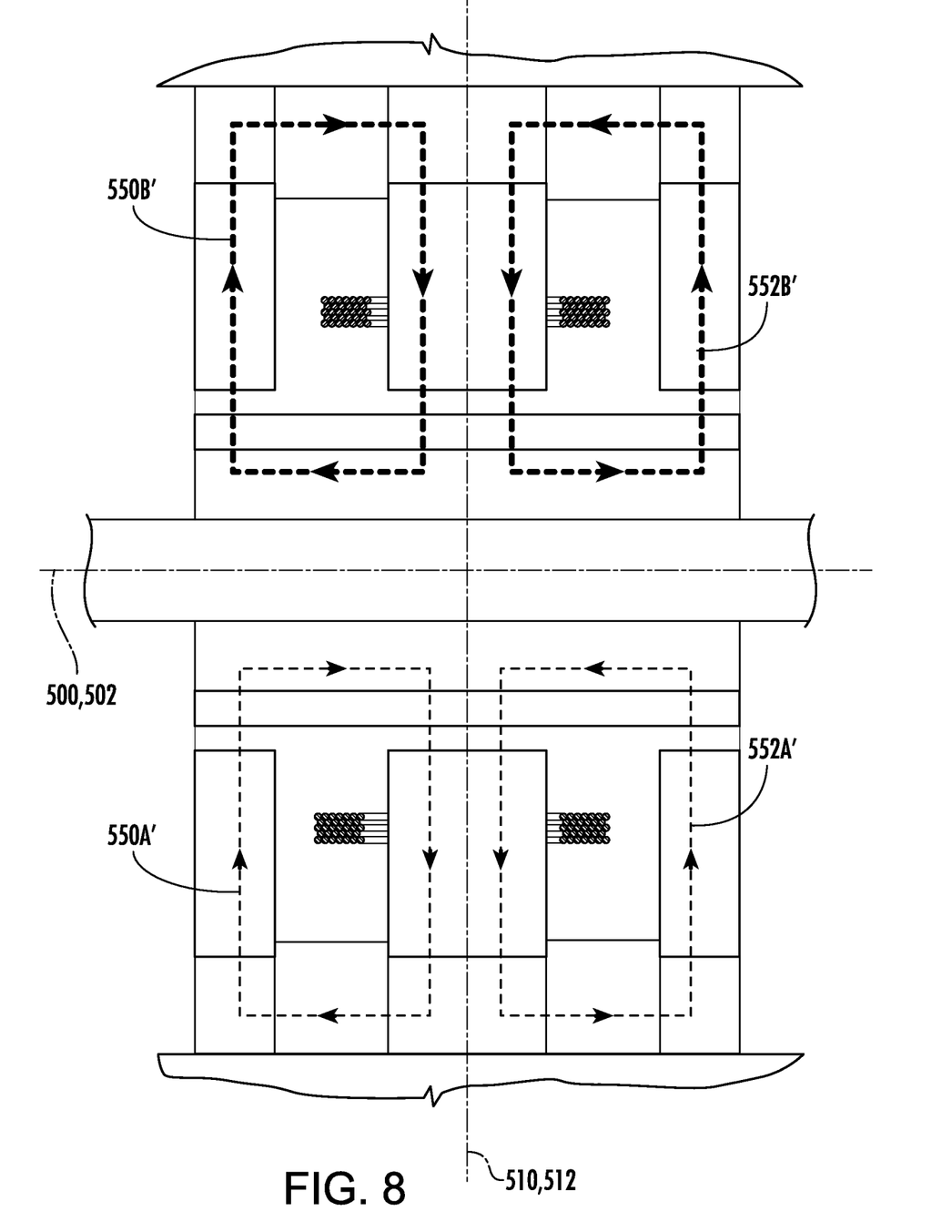
FIG. 8 is a schematic central longitudinal sectional median magnetic flux diagram showing combined permanent magnet and electro-magnet flux.

FIG. 8 shows the fields as modified by electromagnetic bias of the radial coils to exert an upward force on the rotor as viewed in FIG. 8. Specifically, the illustrated coils are energized in such a direction so that their associated magnetic flux augments the loops in the upper half of the sheet and counters the loops in the lower half. The exemplary magnitudes of applied currents are significant enough so that the net flux 550A', 552A' in the lower half is reversed in direction relative to that of FIG. 7. Thus the upper flux loops 550B', 552B' are schematically shown of increased flux by greater line weight than in FIG. 7. The net effect of this is to apply a force to the rotor in the upward direction along the sheet.

Figure 9:
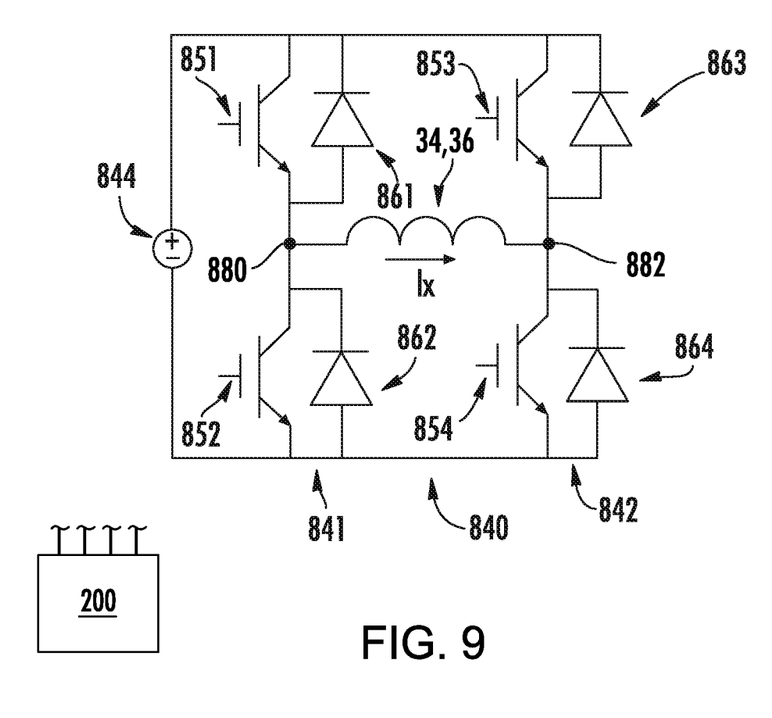
FIG. 9 is a schematic view of an H-bridge amplifier used to power one or more coils.

Electrical hardware may comprise a traditional H-bridge for control of current in the coils 34A, 34B, 36A, 36B such as is disclosed in the WO '775 publication. FIG. 9 shows an H-bridge amplifier 840 used to power one or more coils. This may be controlled by or integrated with the controller 200. In one example, each H-bridge amplifier 840 has a single associated coil and vice-versa. This allows independent powering of the coils so that different current magnitudes may be applied to each. The amplifier 840 has two legs or branches 841 and 842 connected in parallel to a voltage source 844. The exemplary voltage source 844 is a constant DC voltage source and may be shared by the H-bridge amplifiers of the different coils.

The terminals 880 and 882 of the coil are connected across central locations of the two legs 841 and 842. To each side (high voltage and low voltage) of each leg, the terminal 880, 882 is connected to the voltage source via the parallel combination of a respective switching device 851, 852, 853, 854 and diode 861, 862, 863, 864. Exemplary switching devices are gate controlled switching devices such as insulated gate bipolar transistors (IGBT) or metal oxide field effect transistors (MOSFET). As noted above, 880 and 882 may represent terminals of an individual coil. Alternatively, the coils in a given pair may be in series powered by a single H-bridge amplifier so that the terminal 880 is one terminal of the first coil, the terminal 882 is one terminal of the second coil, and the other terminals of the coils are connected to each other.

Alternative embodiments may have asymmetries between the coils of the two respective pairs or the two coils of a given pair. For example, it may be desirable to provide a baseline upward bias. Also, yet alternative embodiments may have configurations other than the two pairs (e.g., three coils and associated teeth at 120° intervals).

FIG. 9 further shows a controller 200. The controller may be integrated with or provided by a controller of the turbomachine (e.g. electric compressor) as a whole or the system (e.g., refrigeration system). The controller may receive user inputs from an input device (e.g., switches, keyboard, or the like) and sensors (not shown, e.g., pressure sensors and temperature sensors at various system locations and, specifically for bearing control, radial position sensors (e.g., as shown in the WO '775 publication) and axial position sensors). The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components. Exemplary control is as disclosed in the WO '775 publication.

Figure 10:
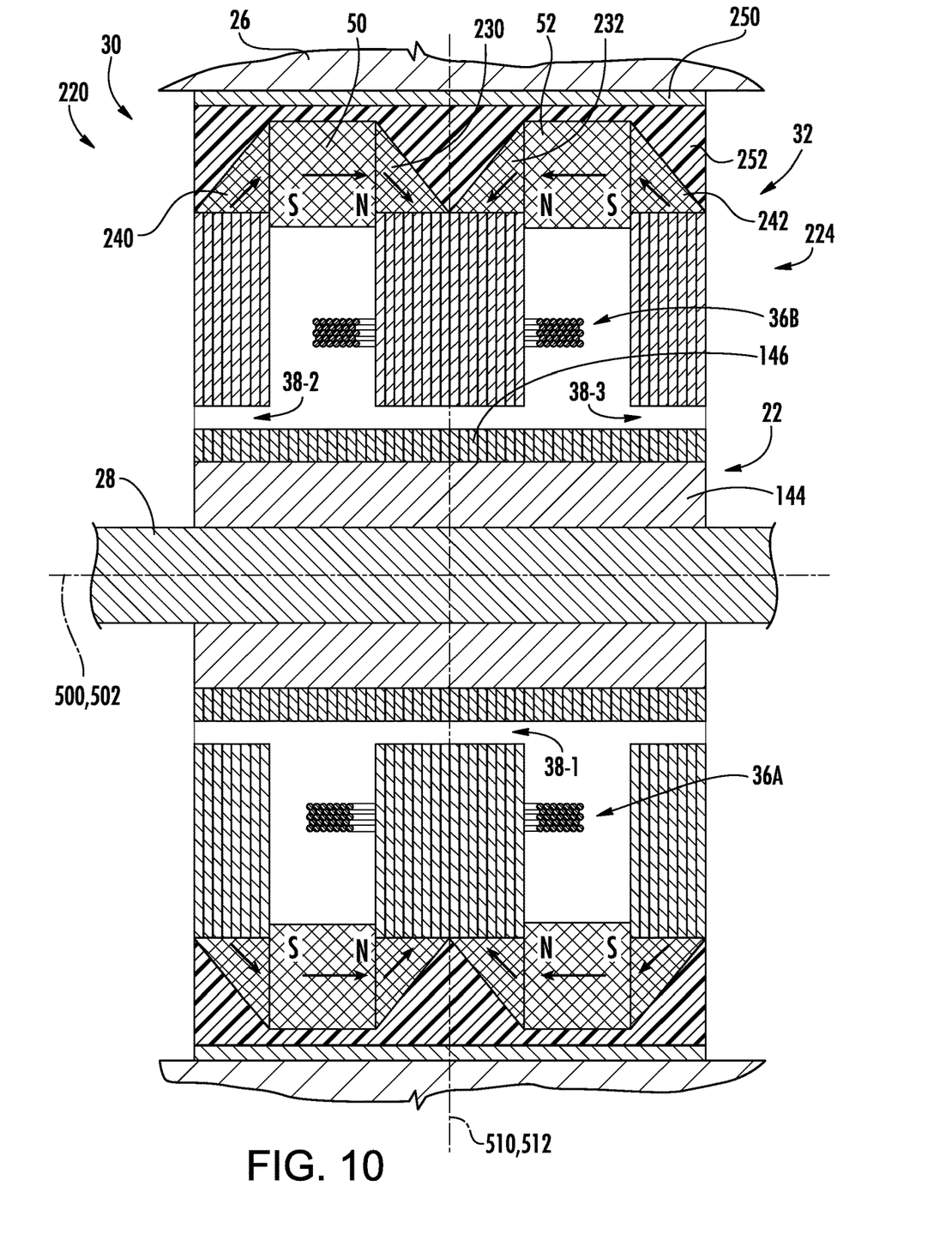
FIG. 10 is a partial, partially schematic, central longitudinal axial sectional view of a first alternate electromagnetic bearing in a compressor.

FIG. 10 shows an alternative bearing 220 involving modifications to the stator 224. Rotor and control details may be the same as discussed regarding the bearing 20 of FIG. 1. Instead of being formed by a single ring of essentially radial magnetic polarization, the one or more intermediate permanent magnets comprise a first ring 230 of one or more first intermediate magnets and a second ring 232 of one or more second intermediate magnets. The rings 230 and 232 have polarities (shown by arrows) substantially off-radial and off-axial to boost the respective flux loops at opposite sides of the transverse centerplane 510, 512 (e.g., between about 25° off-axial and about 65° off-axial, more narrowly, between about 35° off-axial and 55° off-axial). The exemplary rings 230 and 232 are shown with generally right triangular cross-section. Thus, the hypotenuse of the triangular section defines a frustoconical OD surface tapering in the directions shown (converging radially inward toward the transverse centerplane). However, other shapes are possible including rectangular cross-section and a convex line/surface replacing the hypotenuse of the triangle. Optionally (and implementable independently of the dual rings 230 and 232) the exemplary bearing also includes permanent magnet rings 240 and 242 axially outboard of the rings 50 and 52 with polarity similarly off-axial and radial to those of the rings 230 and 232 but so as to again augment the associated flux loops. Thus, the hypotenuse of the cross-section of each of the rings 240 and 242 forms a frustoconical surface radially diverging toward the transverse centerplane or radially converging away from the transverse centerplane.

FIG. 10 also shows further manufacturing variation that could be used in the FIG. 1 implementation or other implementation. In this implementation, the stator includes a circumferential jacket or sleeve 250 (e.g., of steel or other metal) to facilitate mounting in the housing. The exemplary sleeve 250 is full annulus.

Intervening at least partially between the sleeve and various magnets (e.g., at least in portions accommodating the triangular cross-section of various magnets) is an encapsulating material 252 (e.g., a molded polymer optionally fiber-reinforced).

A variety of other variations may be made on the rotor. For example, U.S. Patent Application No. 62/480,405, filed Apr. 1, 2017 the disclosure of which is incorporated by reference in its entirety herein as if set forth at length, discloses several examples of rotors bearing permanent magnets. In one such example of a bearing 320 in FIG. 11, the rotor 322 comprises one or more first permanent magnets 150 and one or more second permanent magnets 152, respectively, radially inboard of the stator permanent magnets 50 and 52 and of respective polarity substantially opposite thereto so as to cooperate with the respective associated stator magnets to define the permanent magnet flux loops associated with the permanent magnet bias discussed above.

Figure 11:
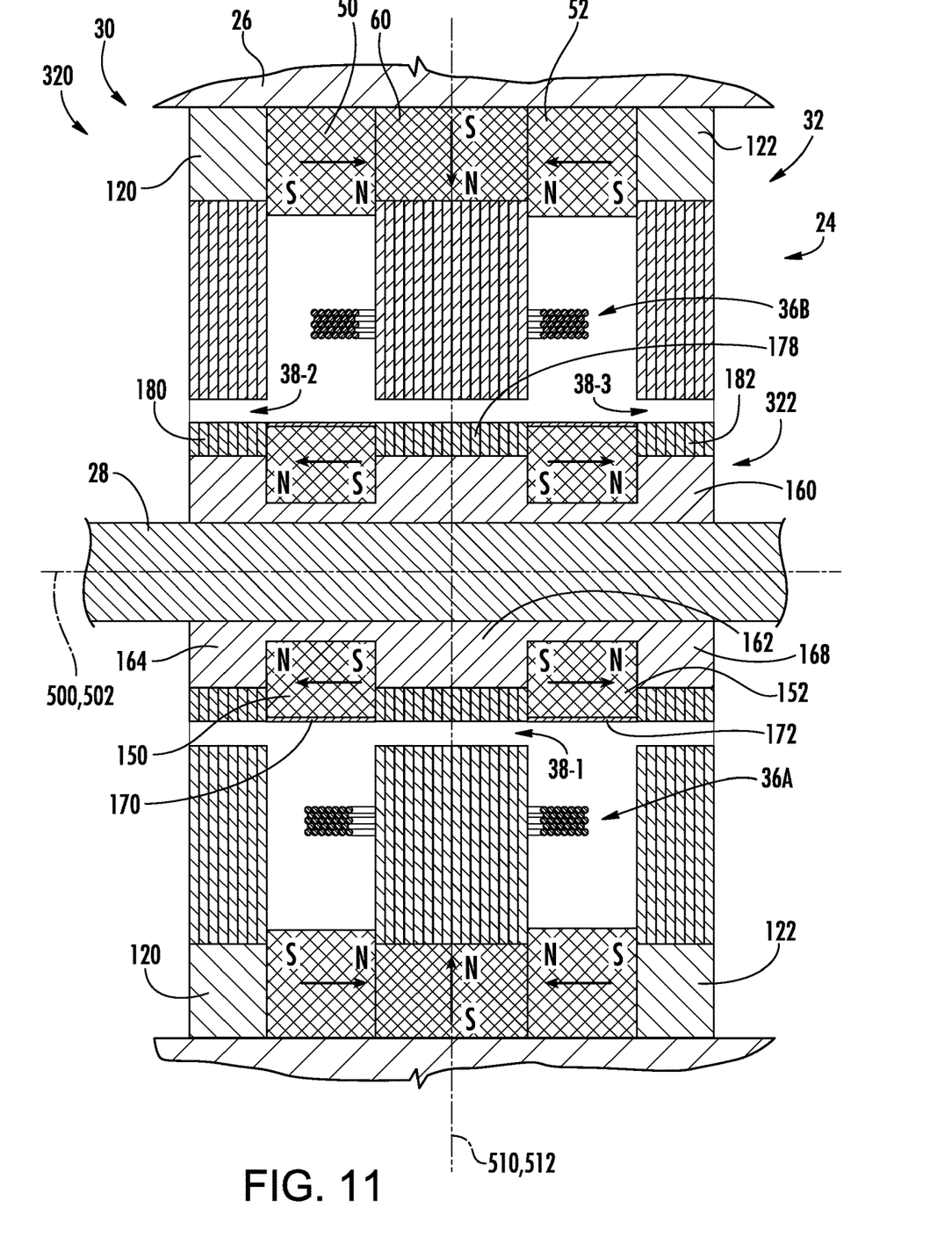
FIG. 11 is a partial, partially schematic, central longitudinal axial sectional view of a second alternate electromagnetic bearing in a compressor.

The exemplary rotor 322 comprises a metallic core 160 (e.g., of a magnetic steel) mounted to the shaft and carrying the stator permanent magnets in associated radially outwardly open channels. For example, the support may be formed by turning of metallic rod stock on a lathe. In such an exemplary one piece support configuration, there are multiple of each permanent magnet 150, 152 forming respective circumferential arrays. For example, end-to-end segments may combine to surround a full 360°. Such a configuration of two or more magnets allows assembly via radial inward insertion. In order to radially retain the magnets, the arrays may be contained by respective jackets 170, 172. Exemplary jackets are non-metallic composite wrapping (e.g., carbon fiber or fiberglass tape in epoxy matrix). Metallic jackets may be relevant to high speed applications.

FIG. 11 also shows the rotor 322 as carrying a center laminate 178 and respective first and second end laminates 180 and 182. These rotor laminates are radially inboard of an axis aligned with the respective stator laminates and define the associated gap portions 38-1, 38-2, and 38-3 therewith.

The exemplary core 160 thus has respective portions 162, 164, and 166 forming a rotor center back iron or yoke and first and second end back irons or yokes. In an alternative configuration, the core 160 is multiple pieces. For example, one piece may form the center back iron and portions radially inboard of the rotor magnets and two respective pieces may form the rotor end yokes. Such a configuration may allow easy assembly of a system with full annulus rotor magnets and no separate retainers. Assembly may be via a series of shrink fits via heating and cooling.

As is discussed further below, the inner diameter boundaries or faces of the rotor 322 laminates are radially outboard of the ID faces or boundaries of the rotor permanent magnets to ease turning of the flux fields.

Contrasted with different alternative prior art bearings, various implementations may have one or more of several advantages. The added stator magnets provide an additional flux boost. For example, in various embodiments this boost may allow use of non-rare earth magnets. This reduces costs. Rare earth magnets are characterized by magnets with use rare earth elements such as dysprosium, terbium, europium, neodymium, samarium, and yttrium. Combined contents of those elements will typically be at least 10.0% by weight (e.g. 10.0% to 50.0%) or at least 20.0%. Neodymium is typically the key element in the main class of rare earth magnets (neodymium magnets), thus non-rare earth magnets may have under 10.0% by weight of this element in particular. Another class is samarium-cobalt magnets (e.g. typically 15% to 45% samarium by weight) Thus, in non-rare earth magnets, samarium may also be below 15.0% or 10.0% by weight. Exemplary non-rare earth magnets are ferrite/ceramic magnets, alnico, manganese bismuth, iron nitride, and the like. However, other embodiments may use rare earth magnets or combinations.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A method for using a magnetic bearing, the magnetic bearing (20; 220; 320) comprising:
a rotor (22; 322) to be supported for rotation about an axis (502);
a stator (24; 224) extending from a first end (30) to a second end (32) and comprising:
one or more first permanent magnets (50);
one or more second permanent magnets (52) axially spaced from the one or more first permanent magnets;
one or more intermediate permanent magnets (60; 230; 232) axially between the one or more first permanent magnets and one or more second permanent magnets;
a plurality of laminate teeth (64A, 64B, 66A, 66B) radially inward of the one or more intermediate permanent magnets; and
a plurality of radial windings (34A, 34B, 36A, 36B) respectively encircling a respective associated tooth of the plurality of teeth, wherein:
the plurality of radial windings comprises a diametrically opposite first pair of windings and a diametrically opposite second pair of windings orthogonal to the first pair of windings; and
for each winding of the first pair of windings and the second pair of windings:
a first permanent magnet flux paths passes as a loop through the winding, the at least one first permanent magnet and the at least one third permanent magnet; and
a second permanent magnet flux paths passes as a loop through the winding, the at least one second permanent magnet and the at least one third permanent magnet
the method comprising:
running current through one winding of the first pair of windings to augment the associated first and second permanent magnet flux paths while running current through the other winding of the first pair of windings to counter the associated first and second permanent magnet flux paths so as to control radial position of the rotor.

2. The method of claim 1 wherein the one or more first permanent magnets and the one or more second permanent magnets are non-rare earth magnets.

3. The method of claim 2 wherein the one or more intermediate permanent magnets are non-rare earth magnets.

4. The method of claim 1 wherein:
the one or more second permanent magnets have a polarity substantially opposite to a polarity of the one or more first permanent magnets; and
the one or more intermediate permanent magnets have a polarity substantially transverse to said polarities of the one or more first permanent magnets and the one or more second permanent magnets.

5. The method of claim 1 wherein the one or more first permanent magnets and the one or more second permanent magnets are full annulus.

6. The method of claim 5 wherein the one or more intermediate permanent magnets, are full annulus.

7. The method of claim 1 being a non-thrust bearing.

8. The method of claim 1 wherein the stator further comprises:
a first end yoke (120) axially abutting the one or more first permanent magnets; and
a second end yoke (122) axially abutting the one or more second permanent magnets.

9. The method of claim 8 wherein the stator further comprises:
a first end laminate (134A, 134B, 136A, 136B) encircled by the first end yoke; and
a second end laminate (138A, 138B, 140A, 140B) encircled by the second end yoke.

10. The method of claim 8 wherein:
the first end yoke is non-laminate steel; and
the second end is non-laminate steel.

11. The method of claim 1 wherein:
the first and second pairs of windings are each powered by a respective associated H-bridge amplifier.

12. The method of claim 1 further comprising:
running current through one winding of the second pair of windings to augment the associated first and second permanent magnet flux paths while running current through the other winding of the second pair of windings to counter the associated first and second permanent magnet flux paths.

13. A magnetic bearing (320) comprising:
a stator (24; 224) extending from a first end (30) to a second end (32) and comprising:
one or more first permanent magnets (50);
one or more second permanent magnets (52) axially spaced from the one or more first permanent magnets;
a first end yoke (120) axially abutting the one or more first permanent magnets;
a second end yoke (122) axially abutting the one or more second permanent magnets;
a first end laminate (134A, 134B, 136A, 136B) encircled by the first end yoke;
a second end laminate (138A, 138B, 140A, 140B) encircled by the second end yoke;
one or more intermediate permanent magnets (60; 230; 232) axially between the one or more first permanent magnets and one or more second permanent magnets;
a plurality of laminate teeth (64A, 64B, 66A, 66B) radially inward of the one or more intermediate permanent magnets; and
a plurality of radial windings (34A, 34B, 36A, 36B) respectively encircling a respective associated tooth of the plurality of teeth; and
a rotor (322) to be supported for rotation about an axis (502) and comprising:
one or more third permanent magnets (150);
one or more fourth permanent magnets (152) axially spaced from the one or more third permanent magnets; and
a center laminate (178) axially between the one or more third permanent magnets and the one or more fourth permanent magnets.

14. The magnetic bearing of claim 13 wherein:
the center laminate has an inner diameter (ID) surface radially outboard of respective inner diameter (ID) surfaces of the at least one third permanent magnet and the at least one fourth permanent magnet.

15. The magnetic bearing of claim 13 wherein the rotor further comprises:
- a first end laminate (180) axially abutting the one or more third permanent magnets; and
- a second end laminate (182) axially abutting the one or more fourth permanent magnets.

16. A machine comprising a bearing according to claim 13.

17. A magnetic bearing comprising
- a rotor (22; 322) to be supported for rotation about an axis (502);
- a stator (224) extending from a first end (30) to a second end (32) and comprising:
  - one or more first permanent magnets (50);
  - one or more second permanent magnets (52) axially spaced from the one or more first permanent magnets;
  - one or more intermediate permanent magnets (230; 232) axially between the one or more first permanent magnets and one or more second permanent magnets, wherein the one or more intermediate permanent magnets comprise one or more first intermediate magnets and one or more second intermediate magnets, wherein:
    - the one or more first intermediate magnets (230) are between the one or more first permanent magnets (232) and the one or more second intermediate magnets (232);
    - the one or more first intermediate magnets have polarities directed partially radially inward relative to polarities of the one or more first permanent magnets; and
    - the one or more second intermediate magnets have polarities directed partially radially inward relative to polarities of the one or more second permanent magnets;
  - a plurality of laminate teeth (64A, 64B, 66A, 66B) radially inward of the one or more intermediate permanent magnets; and
  - a plurality of radial windings (34A, 34B, 36A, 36B) respectively encircling a respective associated tooth of the plurality of teeth.

18. The magnetic bearing of claim 17, wherein the stator further comprises:
- a first outboard permanent magnet ring (240) axially outboard of the one or more first permanent magnets (50) and with polarity off axial and off radial; and
- a second outboard permanent magnet ring (242) axially outboard of the one or more second permanent magnets (52) and with polarity off axial and off radial.

* * * * *